United States Patent [19]
Weidinger

[11] Patent Number: 5,645,153
[45] Date of Patent: Jul. 8, 1997

[54] FRICTION CLUTCH FOR AN INTERNAL COMBUSTION ENGINE IN AN AUTOMOBILE

[75] Inventor: Reinhold Weidinger, Unterspiesheim, Germany

[73] Assignee: Fichtel & Sachs AG, Schweinfurt, Germany

[21] Appl. No.: 541,910

[22] Filed: Oct. 10, 1995

[30] Foreign Application Priority Data

Oct. 10, 1994 [DE] Germany ............... 44 36 109.2

[51] Int. Cl.⁶ ...................................... F16D 13/75
[52] U.S. Cl. ............... 192/70.25; 192/89.25; 192/111 A
[58] Field of Search ............... 192/70.25, 111 A, 192/89.25

[56] References Cited

U.S. PATENT DOCUMENTS

| | | | |
|---|---|---|---|
| 1,797,515 | 3/1931 | Schoenrock | 192/70.25 |
| 2,100,464 | 11/1937 | Almen et al. | 192/89.25 X |

FOREIGN PATENT DOCUMENTS

| | | |
|---|---|---|
| 0568990 | 11/1993 | European Pat. Off. . |
| 2916755 | 11/1979 | Germany . |
| 2920932 | 11/1979 | Germany . |
| 4337613 | 5/1995 | Germany . |
| 2022729 | 12/1979 | United Kingdom . |
| 2264989 | 9/1993 | United Kingdom . |
| 2284025 | 5/1995 | United Kingdom . |

*Primary Examiner*—Rodney H. Bonck
*Attorney, Agent, or Firm*—Nils H. Ljungman and Associates

[57] ABSTRACT

A membrane spring clutch with an automatic wear compensation mechanism. This mechanism provides a ring element between the outside circumference of the membrane spring and the application plate, which ring element is in contact with the application plate and an encircling ring surface, and is provided with oblique surfaces facing the membrane spring. The corresponding opposite surfaces in the membrane spring are produced by plastic deformation of areas of the membrane spring.

19 Claims, 5 Drawing Sheets

FRICTION CLUTCH FOR AN INTERNAL COMBUSTION ENGINE IN AN AUTOMOBILE

BACKGROUND OF THE INVENTION

1. Field of the Invention

The present invention generally relates to a friction clutch for an internal combustion engine, which friction clutch includes a clutch housing. A crankshaft is fastened to a flywheel, which flywheel has a friction surface. The crankshaft can rotate, with the flywheel, around an axis of rotation. The friction clutch also includes an application plate, which application plate has a friction surface. The application plate is mounted in the clutch housing non-rotationally, but in a manner permitting the application plate to move axially. The friction clutch also has a membrane spring with flexible tabs pointing radially inward to push the application plate toward the flywheel. The membrane spring is supported, on one hand, on the application plate and, on the other hand, on the clutch housing.

The friction clutch further includes a clutch plate, which clutch plate has friction linings. The friction linings can be clamped between the friction surfaces of the flywheel and application plate. The friction clutch has a disengagement system for applying pressure to the flexible tabs. There is also a mechanism to make an automatic adjustment for wear of the friction linings. The mechanism adjusting to the wear of the friction linings includes a ring element, which ring element is concentric with the axis of rotation. The ring element is located between the application plate and membrane spring and the ring element is spring-loaded in the circumferential direction. By means of several oblique or inclined surfaces distributed over the circumference of the ring element, the ring element can maintain an essentially constant distance between the membrane spring and the friction surface of the flywheel.

2. Background Information

Such a friction clutch is disclosed, for example, in German Patent 29 20 932. In such a known friction clutch, the oblique or inclined surfaces are, on one hand, applied directly against the application plate and, on the other hand, against a ring element which is made of sheet metal. The process required to manufacture the oblique surfaces on the application plate is quite complex and expensive, since extensive machining has to be performed.

OBJECT OF THE INVENTION

The object of the present invention is to improve the device for the automatic adjustment for wear in a friction clutch, using essentially the same manner of operation.

SUMMARY OF THE INVENTION

The present invention teaches that this object can be accomplished by locating the oblique surfaces in the area of contact between the ring element and the membrane spring, whereby it is possible to have the ring element make contact with the application plate over a circumferentially planar area or support. Such an area or support is easier to manufacture than the oblique surfaces, which oblique surfaces must be introduced by machining. The planar area or support can thereby be manufactured using a normal lathe turning operation.

The present invention also teaches that it is particularly advantageous to introduce the oblique surfaces in the membrane spring by plastic deformation. Both elements, i.e. the ring element and the membrane spring, can be provided with the oblique surfaces during the process of the plastic deformation of the ring element and the membrane spring, which process is typically necessary anyway. Therefore a separate process of the plastic deformation becomes unnecessary.

The present invention also teaches that the membrane spring can have support areas, which support areas can project radially outward and which support areas can be twisted out of the surface. The support areas of the membrane spring can thus form the oblique surfaces. Such a configuration of the membrane spring can be particularly simple, since the twisting or the setting of the projecting support area can be done with precision.

When the word invention is used in this specification, the word "invention" includes "inventions", that is, the plural of "invention". By stating "invention", the applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and in the event that there is more than one invention, that these inventions may be patentable and non-obvious one with respect to the other.

One aspect of the invention resides broadly in a friction clutch for a motor vehicle with automatic compensation for wear, the friction clutch including: a clutch housing; a clutch disc for being disposed on a transmission input shaft having a longitudinal axis, the clutch disc being axially movable along the transmission input shaft; a pressure plate for engaging and disengaging the clutch disc with a flywheel, the pressure plate being axially movable along the transmission input shaft; the clutch disc comprising: friction linings disposed between the pressure plate and the flywheel for contacting the flywheel and the pressure plate upon engagement of the clutch disc; a membrane spring disposed between the clutch housing and the pressure plate for applying pressure to the pressure plate and for biasing the pressure plate towards the flywheel; a wear compensation apparatus comprising: a ring disposed on and in contact with the pressure plate substantially concentrically with respect to the longitudinal axis; a portion of the ring lying in a plane, which plane is substantially perpendicular to the longitudinal axis; the ring comprising a first surface and a second surface; the second surface of the ring being disposed in contact with the pressure plate; the first surface of the ring being disposed opposite the second surface of the ring; the first surface of the ring having at least one portion being angled with respect to the plane; a portion of the membrane spring comprising a first surface, and a second surface disposed opposite the first surface of the membrane spring; at least one portion of the first surface of the portion of the membrane spring comprising an apparatus for providing at least one angled portion being disposed at an angle substantially greater than zero degrees with respect to the plane; the at least one angled portion of the ring being disposed adjacent and in contact with the at least one angled portion of the membrane spring; the ring and the portion of the membrane spring together having a combined initial width dimension for providing contact between the friction linings and the pressure plate; the combined width dimension of the ring and the portion of the membrane spring being disposed substantially parallel to the longitudinal axis; and a device for biasing and rotating the ring with respect to the portion of the membrane spring and for increasing the combined width dimension of the ring and the portion of the membrane spring to compensate for wear of the friction linings.

Another aspect of the present invention resides broadly in a friction clutch for a motor vehicle with automatic compensation for wear, the friction clutch comprising: a clutch housing; a clutch disc for being disposed on a transmission input shaft having a longitudinal axis, the clutch disc being axially movable along the transmission input shaft; a pressure plate for engaging and disengaging the clutch disc with a flywheel, the pressure plate being axially movable along the transmission input shaft; the clutch disc comprising: friction linings disposed between the pressure plate and the flywheel for contacting the flywheel and the pressure plate upon engagement of the clutch disc; a membrane spring disposed between the clutch housing and the pressure plate for applying pressure to the pressure plate and for biasing the pressure plate towards the flywheel; a wear compensation apparatus comprising: a ring disposed on and in contact with the pressure plate substantially concentrically with respect to the longitudinal axis; a portion of the ring lying in a plane, which plane is substantially perpendicular to the longitudinal axis; the ring comprising a first surface and a second surface; the second surface of the ring being disposed in contact with the pressure plate; the first surface of the ring being disposed opposite the second surface of the ring; the first surface of the ring having at least one portion being angled with respect to the plane; a portion of the membrane spring comprising a first surface and a second surface disposed opposite the first surface of the membrane spring; at least one portion of the first surface of the portion of the membrane spring comprising an apparatus for providing at least one angled contact between the ring and the membrane spring; the at least one angled contact of the portion of the membrane spring having at least one portion being disposed at an angle substantially greater than zero degrees with respect to the plane; the at least one angled portion of the ring being disposed adjacent and in contact with the at least one angled portion of the membrane spring; the ring and the portion of the membrane spring together having a combined initial width dimension for providing contact between the friction linings and the pressure plate; the combined width dimension of the ring and the portion of the membrane spring being disposed substantially parallel to the longitudinal axis; and an apparatus for biasing for rotating the ring with respect to the portion of the membrane spring and for increasing the combined width dimension of the ring and the portion of the membrane spring to compensate for wear of the friction linings.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
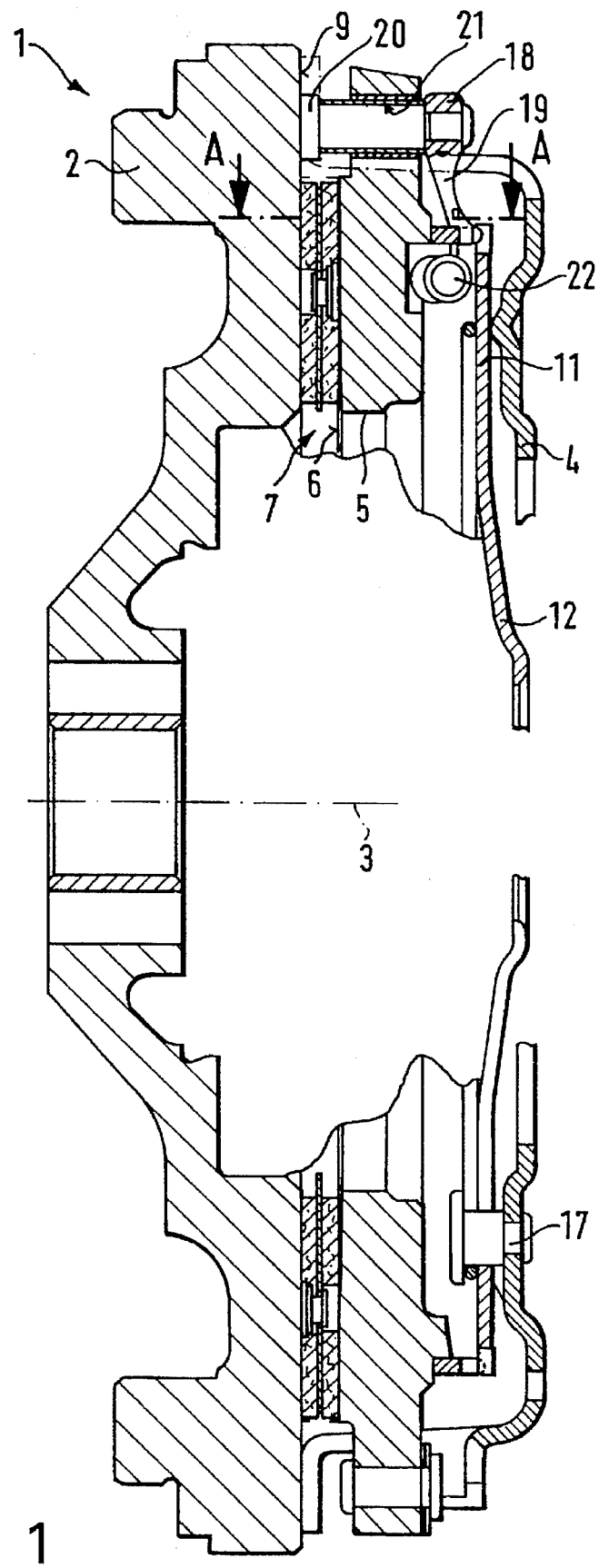
FIG. 1 shows a longitudinal section through a complete friction clutch.
Figure 2:
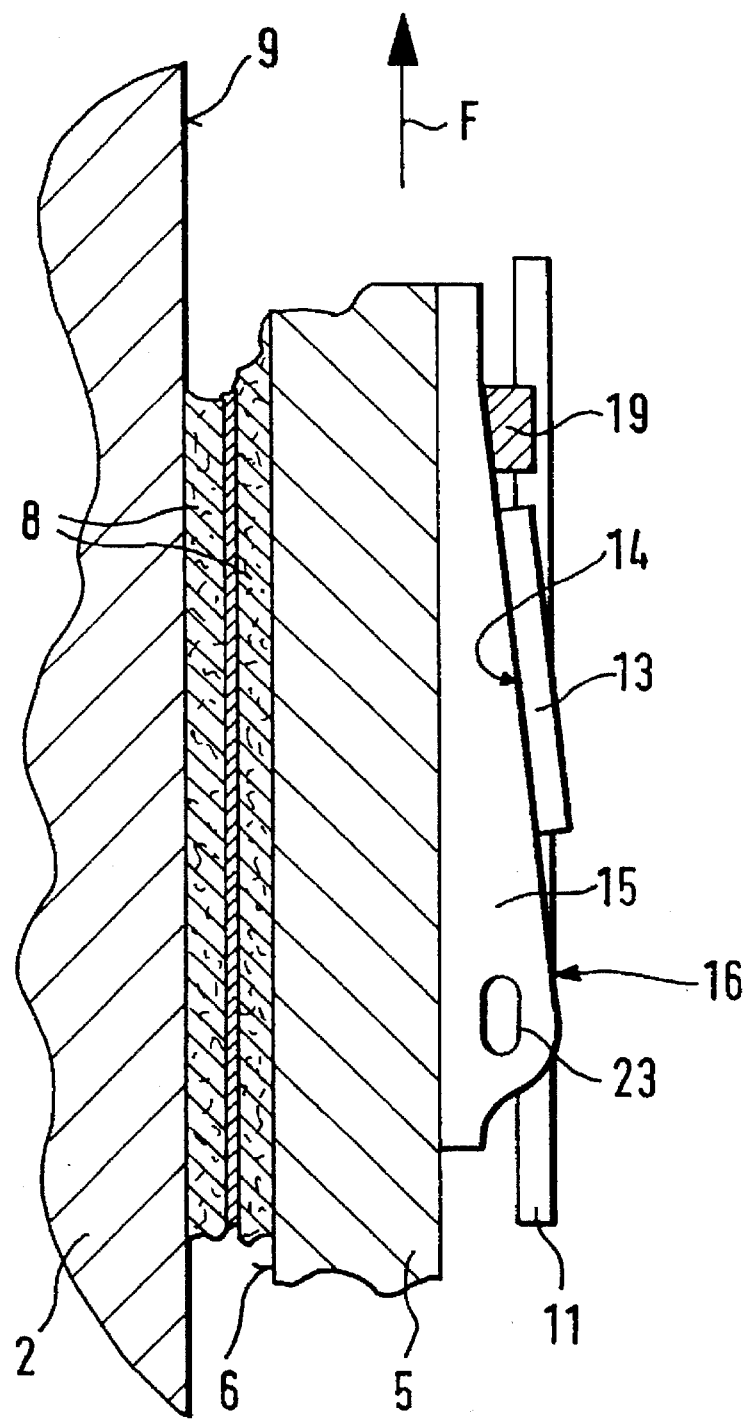
FIG. 2 shows a partial section on an enlarged scale.
Figure 4:
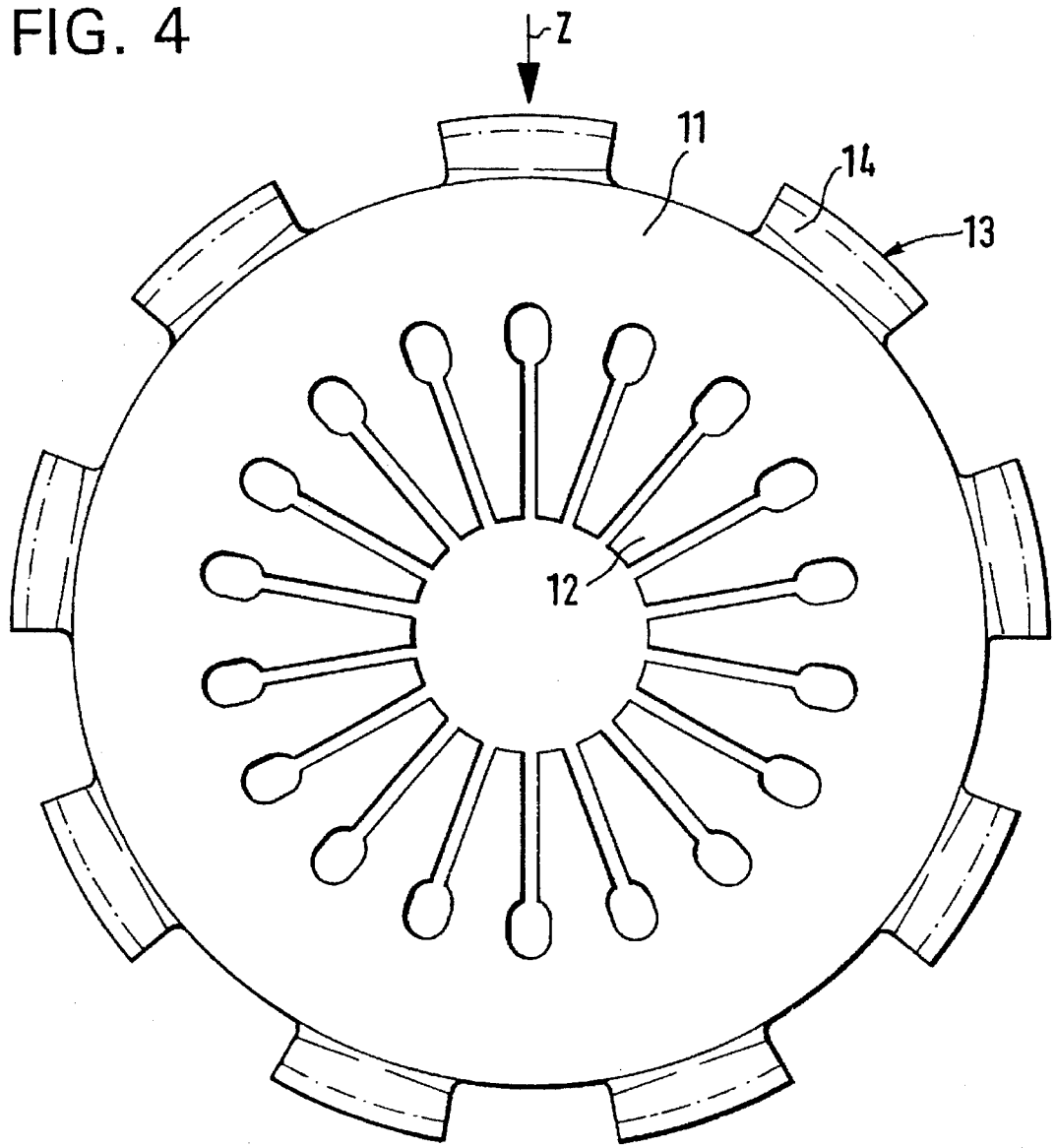
FIGS. 4 and 4a show views of an additional embodiment of the membrane spring.

As shown in FIG. 1, which should be examined with reference to FIG. 2 and, in particular, to FIG. 4, the friction clutch 1 includes a flywheel 2, which flywheel 2 can be fastened to a crankshaft (not shown here) of an internal combustion engine. The flywheel 2 can revolve with the crankshaft around an axis of rotation 3. The flywheel 2, on the side facing away from the crankshaft, can have a friction surface 9. Fastened to the side of the friction surface 9, there can be a clutch housing 4, which clutch housing 4 can hold an application plate 5. The application plate 5 can be fastened non-rotationally to the clutch housing 4, yet in a manner whereby the application plate can move axially within the clutch housing 4. Tangential leaf springs can preferably be used for this purpose. The application plate 5 can preferably be spring-loaded, by a membrane spring 11, toward the flywheel 2, whereby the membrane spring 11 can be mounted so that the membrane spring 11 can pivot in the vicinity of an intermediate diameter, e.g. by means of spacer bolts 17, on the clutch housing 4. The membrane spring 11 can have, in its radially inner area, flexible tabs 12, and, by means of the radially outer area of the membrane spring 11, the membrane spring 11 can press against the application plate 5. The flexible tabs 12 of the membrane spring 11 can be located radially inward, as mentioned above, and the ends of the flexible tabs 12 can be actively connected to a disengagement system. The application plate 5 has a friction surface 6, which friction surface 6 can be located opposite the friction surface 9 of the flywheel 2.

Figure 1A:
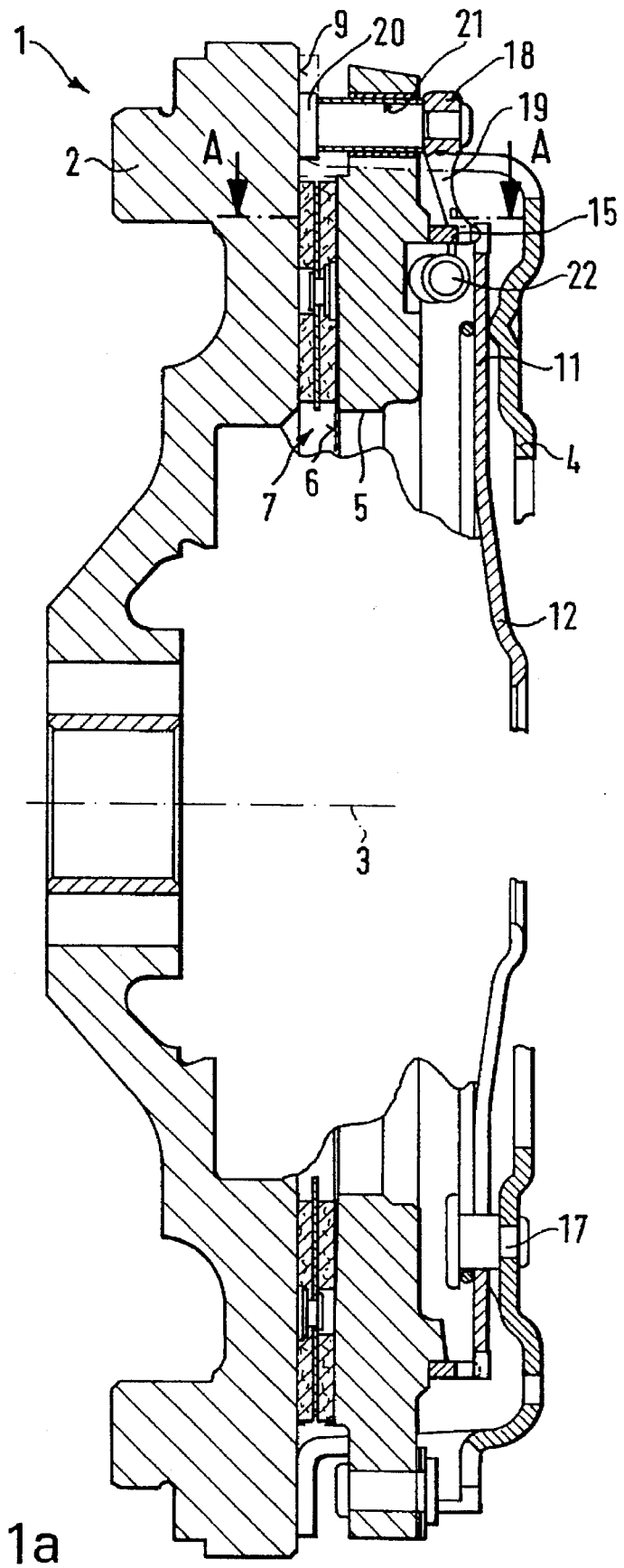
FIG. 1a shows the same view as shown in FIG. 1 only with added components.

As shown in FIG. 2, friction surfaces 8 of a clutch plate 7 can be located between the two friction surfaces 6, 9. The clutch plate 7 can be non-rotationally fastened to a transmission shaft (not shown here). In accordance with one embodiment of the present invention, FIG. 2 can be considered to represent a cross-sectional view along line A—A in FIGS. 1 and 1a. Between the radially outer area of the membrane spring 11 and the application plate 5, there can be a ring element 15, as shown in FIGS. 1a and 2. The ring element 15 can preferably be concentric with respect to the axis of rotation 3 and can lie on a planar ring surface of the application plate 5. By means of springs 22, as shown in FIG. 1, the ring element 15 can be spring loaded on the circumference toward the application plate 5. On the side of the ring element 15 facing away from the application plate 5, the ring element 15 can have several oblique surfaces 16 distributed over the circumference, which oblique surfaces 16 can together create an ascending gradient. The membrane spring 11 can have corresponding oblique surfaces 14. The membrane spring 11 can be in contact, by means of its corresponding oblique surfaces 14, with the oblique surfaces 16 of the ring element 15.

In accordance with one embodiment of the present invention, the oblique surfaces 14 of the membrane spring 11 can be formed by support areas 13, which support areas 13 can project radially from the spring body of the membrane spring 11. The support areas 13 can all be deformed in a direction that is essentially twisted with respect to the plane of the membrane spring 11. The ring element 15 can have several openings 23 distributed over the circumference, in each of which openings 23 a spring 22 can be engaged, to exert a spring force on the ring element 15 in the direction indicated by the arrow F, as shown in FIG. 2. On the basis of the conventional clutches described above, it can now be possible to provide an axial limit stop or a limitation of distance travelled for the application plate 5, and in that case, the present invention can preferably function as follows:

When the friction linings 8 are not worn, the distance travelled by the clutch pedal can result in a downward stroke of the application plate 5, which downward stroke can correspond to the specified limit stop or limitation of distance travelled. As the wear on the friction linings 8 increases, the application plate 5 can be displaced, with respect to the components of the limit stop, toward the flywheel 2. Thereby, the displacement of the application plate 5 can allow the clutch pedal to be depressed essentially a greater distance. That means that the limit stop can hold the application plate 5 in a position in which the driver, by means of the clutch pedal, can essentially cause additional travel of the membrane spring 11. By this additional distance, the membrane spring 11 can lift up, in the vicinity of its oblique surfaces 14, from the oblique surfaces 16 of the ring element 15, so that there are essentially no forces exerted on the adjustment device in the axial direction. The springs 22 can then rotate the ring element 15 in the direction indicated by the arrow F so that there can once again be contact between the oblique surfaces 14 and 16. Thus, in spite of the wear of the friction linings 8, and the corresponding movement of the application plate 5 toward the flywheel 2, the original position of the membrane spring 11 in the clutch housing 4 can be re-established, i.e. the distance between the radially outer region of the membrane spring 11 and the friction surface 9 on the flywheel 2 can be kept essentially constant. It is thereby possible to keep the membrane spring 11, in spite of the wear to the friction linings 8, in an essentially constant position in the clutch housing 4, so that the application forces of the membrane spring 11 can remain constant.

In summary, in accordance with one embodiment of the present invention, as the friction linings 8 become worn, the application plate 5 should be essentially additionally displaced to a position closer to the flywheel 2. When the application plate 5 travels this additional distance toward the flywheel 2, the oblique surfaces 16 of the ring element 15 can be pulled away from the oblique surfaces 14 of the membrane spring 11, whereby, at least momentarily, there is no longer an axial force between the oblique surfaces 14 and 16. As a result, the springs 22, in the openings 23 of the ring element 15, can be free to apply a force on the ring element 15 to thereby rotate the ring element 15 in a direction F as shown in FIG. 2. The oblique surface 16 of the ring element 15 can then once again be adjacent, and in contact with, the oblique surface 14 of the membrane spring 11. Thus, in spite of the wear of the friction linings 8, the membrane spring 11 can be kept in an essentially constant position with respect to the clutch housing 4, thereby maintaining the essentially constant application forces provided by the membrane spring 11.

In accordance with an embodiment of the present invention, the limit stop or limitation of distance travelled can also be configured as illustrated in FIG. 1. For this purpose, there can preferably be several clearance sensors 18 distributed around the circumference of the friction clutch 1. The clearance sensors 18 can be movably guided against a friction force in a hole 21 in the application plate 5, which hole 21 can extend substantially parallel to the axis of rotation 3. In the engaged position, each of the clearance sensors 18 can be in contact, by means of a head 20, with the flywheel 2, preferably against the friction surface 9 of the flywheel 2. Each clearance sensor 18, on the side of the application plate 5 facing away from the friction linings 8, can extend radially inward by means of an arm 19, whereby the arm 19 can be in contact with the ring element 15, essentially always in the vicinity of an oblique surface 16. As long as no wear occurs on the friction linings 8, the application plate 5 can be held in contact with the radially outside area of the membrane spring 11 by means of the ring element 15, under essentially all operating conditions. This can be accomplished either by a separate spring device, or, this function can be performed by the tangential leaf springs. The magnitude of the friction between the clearance sensors 18 and the application plate 5 is preferably determined so that the springs 22 essentially cannot twist the ring element 15 against this friction force.

When wear does occur, and during the subsequent engagement process, the heads 20 of the clearance sensors 18 can come into contact prematurely with the friction surface 9, even before the friction surfaces 6 and 9 can clamp the corresponding friction linings 8. The application plate 5 can then be moved by the force of the membrane spring 11 further toward the flywheel 2, and, thus, the clearance sensors 18 can be displaced by the amount of the wear relative to the application plate 5, and namely away from the flywheel 2. Thus, there can be a clearance between the arms 19 and the oblique surfaces 16, which clearance corresponds to the magnitude of the wear. On the occasion of the next disengagement process, when the membrane spring 11 reduces its pressure, via the ring element 15, on the application plate 5, it is possible for the springs 22 to rotate the ring element 15 in the circumferential direction, as indicated by arrow F, and thereby toward the application plate 5, until the clearance with respect to the arms 19 has essentially been reduced once again. In this manner, the original installed position of the membrane spring 11 can be essentially re-established, and the membrane spring 11 can again operate in its specified force range.

Figure 4A:
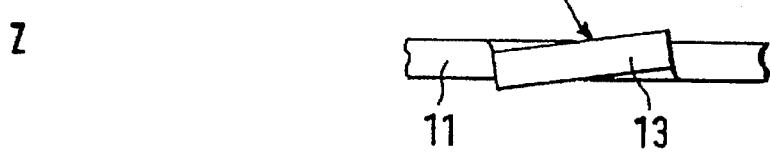

In accordance with an embodiment of the present invention, the membrane spring 11 can thereby be designed as shown in FIGS. 4 and 4a. The membrane spring 11 can have several support areas 13, which support areas 13 can project radially outward. The support areas 13 can preferably be twisted with respect to the surface or plane of the membrane spring 11, as shown in FIG. 4a, which FIG. 4a shows a view Z of FIG. 4, to thereby form the oblique surfaces 14. This plastic deformation can be accomplished relatively easily and precisely, and this plastic deformation can be performed at the same time as the other deformation processes which are necessary in any case.

In accordance with an embodiment of the present invention, the springs 22 can preferably be engaged within the openings 23 of the ring element 15. There can also preferably be similar openings formed in the support areas 13 of the membrane spring 11. These openings can preferably be formed in the middle of the support areas 13, or, alternatively, the openings can be formed in ends of the support areas 13 of the membrane spring 11. A tension spring can preferably be suspended between the openings 23 of the ring element 15 and the similar openings of the support areas 13 of the membrane spring 11. The tension spring can preferably be similar, for example, to the spring 25' with reference to FIG. 3a', as discussed hereinbelow. The openings 23 of the ring element 15, and the similar openings in the support areas 13 of the membrane spring 11, can each preferably be dimensioned to accept the ends of the tension spring. As a result of the connection between the ring element 15 and the membrane spring 11, by means of the tension spring, the ring element 15 can thereby rotate in the direction as indicated by the arrow F, as shown in FIG. 2, when the friction linings 8 are worn. Alternatively, tabs can be formed on the support areas 13 of the membrane spring 11, which tabs can be attached to one end of the tension spring. Furthermore, the tabs or openings can be formed in a portion of the membrane spring 11 itself. It may also be possible to form the tabs or openings in the application plate 5, or in other components which can rotate with the application plate 5, whereby the ends of the tension spring can provide a connection permitting the ring element 15 to rotate in the direction F as shown in FIG. 2. As a result, the ring element 15 can compensate for the wear of the friction linings 8.

Figure 3:
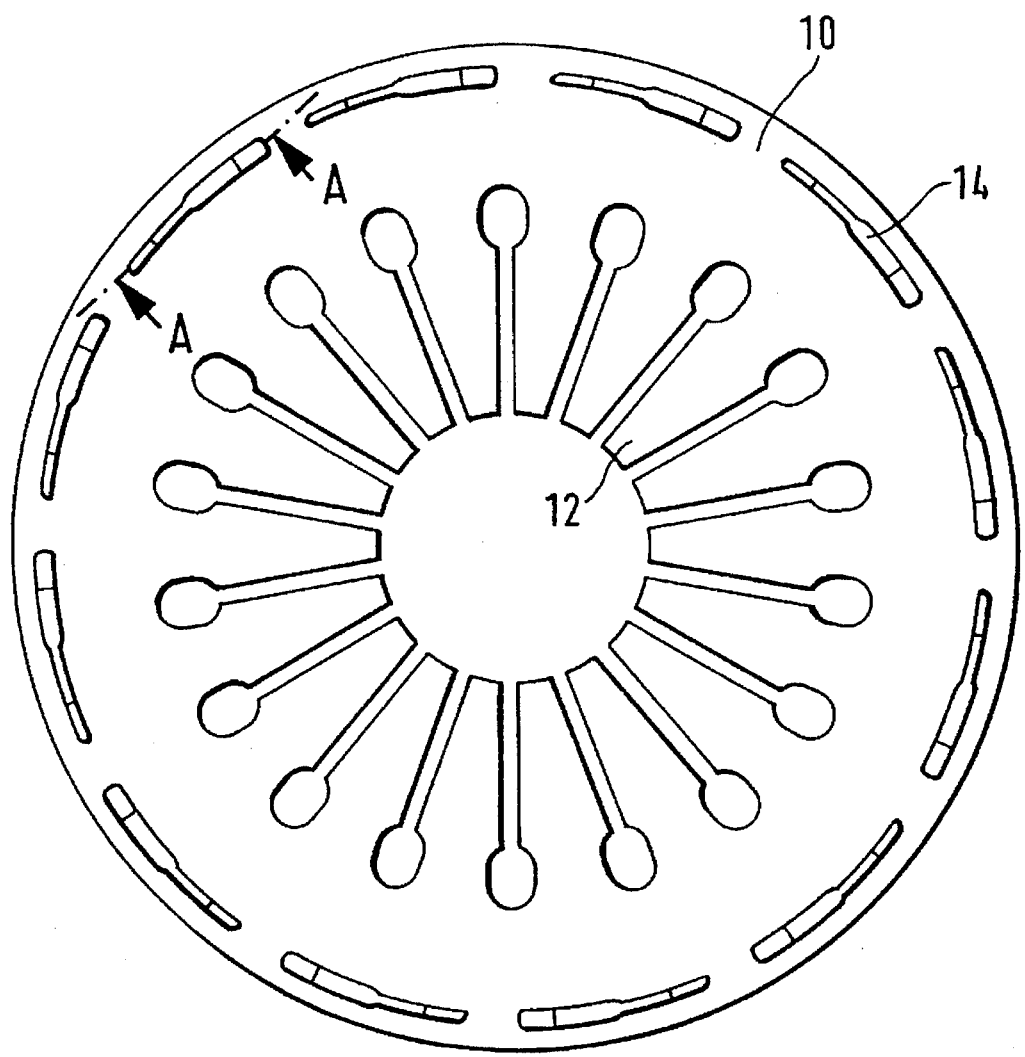
FIGS. 3 and 3a show views of an embodiment of the membrane spring.
Figure 3A:
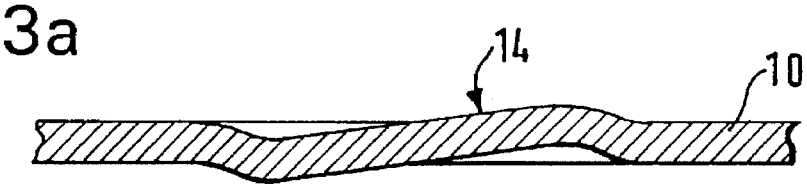

In accordance with an additional embodiment of the present invention, it is also possible to provide a membrane spring 10 as shown in FIGS. 3 and 3a. This membrane spring 10 can have a closed or continuous external contour. In the area of contact of the membrane spring 10 with the ring element 15, the oblique surfaces 14 can be introduced directly into the material of the membrane spring 10, as shown in FIG. 3a, which FIG. 3a shows partial section A-A. This plastic deformation can also preferably be performed during the process of manufacturing the membrane spring 10.

In accordance with an embodiment of the present invention, the oblique surfaces 14 and 16 can include essentially smooth surfaces, for example. Alternatively, the oblique surfaces 14 and 16 can be other than straight or smooth surfaces. For example, the oblique surfaces 14 and 16 can include individual matching steps whereby each of the oblique surfaces 14 and 16 can be configured to include individual shoulders designed to correspond to and fit into one another. Alternatively, the oblique surfaces 14 and 16 can be configured to include angles.

It should be noted that on a "pulled" clutch, the oblique surfaces 14 in the membrane spring 11 can preferably be located on an intermediate diameter Of the membrane spring 11, by means of which the membrane spring 11 can be in contact with the application plate 5.

One feature of the invention resides broadly in the friction clutch for an internal combustion engine, comprising a clutch housing, which is fastened to a flywheel which has a friction surface, and rotates with the flywheel around an axis of rotation, an application plate which has a friction surface, which application plate is mounted in the clutch housing non-rotationally but so that it can move axially, a membrane spring which has flexible tabs pointing radially inward to push the application plate toward the flywheel, and which is supported on one hand on the application plate and on the other hand on the clutch housing, a clutch plate which has friction linings which can be clamped between the friction surfaces of the flywheel and application plates, a disengagement system for applying pressure to the flexible tabs, a mechanism to make an automatic adjustment for wear of the friction linings, with a ring element which is concentric with the axis of rotation and located between the application plate and membrane spring, is spring-loaded in the circumferential direction, and by means of several oblique or bevelled or inclined surfaces distributed over the circumference maintains a constant distance between the membrane spring and the friction surface of the flywheel, characterized by the fact that the ring element 15 is in contact with the application plate 5 by means of a circumferential plane area or surface, and the oblique surfaces 14, 16 are provided in the area of contact between the ring element 15 and the membrane spring 10, 11.

Another feature of the invention resides broadly in the friction clutch characterized by the fact that the oblique surfaces 14 are introduced in the membrane spring 10, 11 by plastic deformation.

Yet another feature of the invention resides broadly in the friction clutch characterized by the fact that the membrane spring 11 has support areas 13 which project radially outward, and which are twisted out of the surface, and thus form the oblique surfaces 14.

Types of clutch assemblies which have wear sensors or adjustment mechanisms for detecting and adjusting for the wear of the friction linings of a clutch may be disclosed by the following United States Patents: No. 4,191,285 to Thelander et al. on Mar. 4, 1980, entitled "Wear Compensator for Belleville Spring Clutch"; No. 5,238,093 to Campbell on Aug. 24, 1993, entitled "Wear Indicator for Adjustable Clutch"; No. 4,953,680 to Flotow on Sep. 4, 1990, entitled "Clutch Adjuster"; No. 4,549,643 to Flotow et al. on Oct. 29, 1985, entitled "Self Adjusting Device for a Friction Clutch"; No. 4,310,086 to Mochida on Jan. 12, 1982, entitled "Automatic Adjusting Device for a Clutch Operating Mechanism"; and No. 4,285,424 to Sink et al. on Aug. 25, 1981, entitled "Locking Device for a Friction Type Clutch".

Types of manual transmissions in which the present invention may be incorporated may be disclosed by the following United States Patents: No. 5,036,721 to Gugin on Aug. 6, 1991, entitled "Shift Control Mechanism for a Manual Transmission"; No. 4,222,283 to Nagy on Sep. 16, 1980, entitled "Manual Transmission Lubrication System"; No. 3,858,460 to Porter et al. on Jan. 7, 1975, entitled "Four Speed Manual Transmission and Control"; and No. 5,269,400 to Fogelberg on Dec. 14, 1993, entitled "Transmission Synchronizer".

Types of clutch assemblies in which the present invention may be incorporated may be disclosed by the following United States Patents: No. 4,635,780 to Wiggen on Jan. 13, 1987, entitled "Clutch Disc for a Motor Vehicle Friction Clutch"; No. 4,684,007 to Maucher on Aug. 4, 1987, entitled "Clutch Plate"; No. 4,433,771 to Caray on Feb. 28, 1984, entitled "Torsion Damping Device for a Clutch Plate"; and No. 4,099,604 to Higgerson on Jul. 11, 1978, entitled "Friction Clutch with Integral Adjuster".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 36 109.2, filed on Oct. 10, 1994, having inventor Reinhold Weidinger, and DE-OS P 44 36 109.2 and DE-PS P 44 36 109.2 are hereby incorporated by reference as if set forth in their entirety herein.

Examples of friction clutches with automatic wear compensators that may be utilized in accordance with the embodiments of the present invention, may be found in the following Federal Republic of Germany Patent Applications: No. P 43 14 024 and No. P 43 37 613.4.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle with automatic compensation for wear, said friction clutch comprising:
 a clutch housing;
 a clutch disc for being disposed on a transmission input shaft having a longitudinal axis, said clutch disc being axially movable along the transmission input shaft;
 pressure plate means for engaging and disengaging said clutch disc with a flywheel, said pressure plate means being axially movable along the transmission input shaft;
 said clutch disc comprising:
  friction lining means disposed between said pressure plate means and the flywheel for contacting the flywheel and said pressure plate means upon engagement of said clutch disc;
 membrane spring means disposed between said clutch housing and said pressure plate means for applying pressure to said pressure plate means and for biasing said pressure plate means towards the flywheel;
 wear compensation means;
 said wear compensation means comprising:
  a ring disposed on, and in contact with, said pressure plate means substantially concentrically with respect to the longitudinal axis;
  a portion of said ring lying in a plane, which plane is substantially perpendicular to the longitudinal axis;
  said ring comprising a first surface and a second surface;
  said second surface of said ring being disposed in contact with said pressure plate means;
  said first surface of said ring being disposed opposite said second surface of said ring;
  said first surface of said ring having at least one portion being angled with respect to said plane;
  a portion of said membrane spring means comprising a first surface and a second surface disposed opposite one another;
  at least one portion of said first surface of said portion of said membrane spring means comprising means for providing at least one angled portion being disposed at an angle substantially greater than zero degrees with respect to said plane;
  said at least one angled portion of said ring being disposed adjacent, and in contact with, said at least one angled portion of said membrane spring means;
  said ring and said portion of said membrane spring means together having a combined initial width dimension for providing contact between said friction lining means and said pressure plate means;
  said combined width dimension of said ring and said portion of said membrane spring means being disposed substantially parallel to said longitudinal axis; and
  biasing means for rotating said ring with respect to said portion of said membrane spring means and for increasing the combined width dimension of said ring and said portion of said membrane spring means, to compensate for wear of said friction lining means.

2. The friction clutch according to claim 1, wherein said ring comprises a sole ring.

3. The friction clutch according to claim 2, wherein said at least one angled portion of said membrane spring means comprises a plastically deformed portion having been formed by plastic deformation of said portion of said membrane spring means during manufacture.

4. The friction clutch according to claim 3, wherein at least one of:
 said at least one angled portion of said membrane spring means; and
 said at least one angled portion of said ring; comprises a substantially planar portion.

5. The friction clutch according to claim 3, wherein said at least one angled portion of said ring comprises a substantially smooth sloped portion.

6. The friction clutch according to claim 5, wherein:
 said at least one angled portion of said membrane spring means comprises a substantially smooth sloped portion; and
 said substantially smooth sloped portions of each of said ring and said membrane spring means are in contact with one another.

7. The friction clutch according to claim 6, wherein:
 said membrane spring means comprises a membrane spring;
 said membrane spring having a first side and a second side;
 said first side of said membrane spring is disposed toward said ring;
 said second side of said membrane spring is disposed opposite said first side of said membrane spring, and facing away from said ring;
 said first side and said second side of said membrane spring each respectively comprise a first surface and a second surface;
 each of said first surface and said second surface of said membrane spring are disposed to lie in a plane, said plane being perpendicular to said longitudinal axis;
 said membrane spring has an outer circumference;
 said at least one angled portion of said membrane spring comprises at least one of a) and b) as follows:
  a) a plurality of portions projecting from said outer circumference of said membrane spring;
  said plurality of projecting portions comprising a plurality of tabs;
  said plurality of tabs are disposed spaced apart from one another about said outer circumference of said membrane spring;
  said plurality of tabs extend radially outward with respect to said outer circumference of said membrane spring;
  each of said plurality of tabs have a first surface and a second surface;
  said first surface and said second surface of each of said plurality of tabs are disposed to lie in a plane;
  said plane of said first surface and said second surface of each of said plurality of tabs is twisted at a substantial angle with respect to said plane of said first surface and said second surface of said membrane spring; and
  b) a plurality of bent portions;
  said plurality of bent portions are disposed within said first surface and said second surface of said membrane spring;
  said plurality of bent portions comprise a plurality of undulations;
  said plurality of undulations are formed concentrically within said outer circumference of said membrane spring;
  each of said plurality of undulations has a first surface and a second surface;

said first surface and said second surface of each of said plurality of undulations are disposed to lie in a plane; and said plane of said first surface and said second surface of each of said plurality of undulations is disposed at a substantial angle with respect to said plane of said first surface and said second surface of said membrane spring.

8. The friction clutch according to claim 7, wherein:

said biasing means for rotating said ring comprises a tension spring;

said friction clutch further comprises:

means for sensing wear of said friction lining means; and said means for sensing wear of said friction lining means comprising means for permitting rotation of said ring with respect to said membrane spring, to increase said combined initial width dimension to adjust for said wear of said friction lining means.

9. The friction clutch according to claim 8, wherein:

said pressure plate means comprises a pressure plate;

said pressure plate is substantially torsionally stationary with respect to said clutch housing;

said pressure plate has an outer circumference;

a portion of said outer circumference of said pressure plate comprises an aperture;

said aperture extends parallel to said longitudinal axis;

said aperture has a first end portion and a second end portion;

said first end portion is disposed adjacent a portion of said flywheel;

said second end portion of said aperture is disposed a substantial distance from said first end portion of said aperture;

said aperture further comprises a bolt;

said bolt has a first end and a second end;

said first end of said bolt comprises a bolt head;

said bolt head being adjacent, and in contact with, a portion of said flywheel;

said means for sensing wear of said friction lining means is disposed adjacent, and in contact with, said second end portion of said aperture;

said second end of said bolt is disposed adjacent said means for sensing wear;

said means for sensing wear further comprises an arm;

said arm of said sensing means extends in a substantially radial direction toward said ring;

said arm has a first end and a second end;

said second end of said arm is disposed a substantial distance from said first end of said arm;

said first end of said arm is operatively connected with said means for sensing wear;

said second end of said arm is disposed adjacent, and in contact with, a portion of said ring;

said arm comprises means for permitting rotation of said ring with respect to said membrane spring upon wear of said friction lining means;

each of said plurality of tabs of said membrane spring has a first end and a second end;

each of said first end and said second end of said plurality of tabs is disposed to project radially outward with respect to said outer circumference of said membrane spring;

each of said plurality of tabs has a third end and a fourth end;

said fourth end of each of said plurality of tabs is disposed to concentrically surround a portion of said outer circumference of said membrane spring;

said third end of each of said plurality of tabs is disposed adjacent, and in contact with, a portion of said outer circumference of said membrane spring;

each of said plurality of undulations of said membrane spring has a first end portion and a second end portion;

said first end portion extends at a substantial angle with respect to said plane of at least one of: said first surface and said second surface of said membrane spring; and said second end portion extends at a substantial angle with respect to said plane of at least the other of: said first surface and said second surface of said membrane spring.

10. A friction clutch for a motor vehicle with automatic compensation for wear, said friction clutch comprising:

a clutch housing;

a clutch disc for being disposed on a transmission input shaft having a longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:

friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means and for biasing said pressure plate means towards the flywheel;

wear compensation means;

said wear compensation means comprising:

an annular member operatively engaged with said pressure plate means;

said annular member being substantially concentrically disposed with respect to the longitudinal axis;

a portion of said annular member lying in a plane, which plane is substantially perpendicular to the longitudinal axis;

said annular member comprising a first surface;

said first surface of said annular member facing away from said pressure plate means;

said first surface of said annular member having at least one portion being angled with respect to said plane;

a portion of said membrane spring means comprising a first surface and a second surface disposed opposite said first surface of said membrane spring means;

at least one portion of said first surface of said portion of said membrane spring means comprising means for providing at least one angled contact between said annular member and said membrane spring means;

said at least one angled contact of said portion of said membrane spring means having at least one portion being disposed at an angle substantially greater than zero degrees with respect to said plane;

said at least one angled portion of said annular member being disposed adjacent and in contact with said at least one angled portion of said membrane spring means;

said annular member and said portion of said membrane spring means together having a combined initial width dimension for providing contact between said friction lining means and said pressure plate means;

said combined width dimension of said annular member and said portion of said membrane spring means being disposed substantially parallel to said longitudinal axis; and biasing means for relatively rotating said annular member and said portion of said membrane spring means and for increasing the combined width dimension of said annular member and said portion of said membrane spring means to compensate for wear of said friction lining means.

11. The friction clutch according to claim 10, wherein:

said annular member has a second surface;

said second surface of said annular member is disposed opposite said first surface of said annular member, and in contact with said pressure plate means; and said annular member comprises a ring.

12. The friction clutch according to claim 11, wherein said ring comprises a sole ring.

13. The friction clutch according to claim 12, wherein said at least one angled portion of said membrane spring means comprises a plastically deformed portion having been formed by plastic deformation of said portion of said membrane spring means during manufacture.

14. The friction clutch according to claim 13, wherein at least one of:

said at least one angled portion of said membrane spring means; and said at least one angled portion of said ring; comprises at least one substantially planar portion.

15. The friction clutch according to claim 13, wherein said at least one angled portion of said ring comprises at least one substantially smooth sloped portion.

16. The friction clutch according to claim 15, wherein:

said at least one angled portion of said membrane spring means comprises at least one substantially smooth sloped portion; and said at least one substantially smooth sloped portion of each of said ring and said membrane spring means are in contact with one another.

17. The friction clutch according to claim 16, wherein:

said membrane spring means comprises a membrane spring;

said membrane spring having a first side and a second side;

said first side of said membrane spring is disposed toward said ring;

said second side of said membrane spring is disposed opposite said first side of said membrane spring, and facing away from said ring;

said first side and said second side of said membrane spring each respectively comprise a first surface and a second surface;

each of said first surface and said second surface of said membrane spring are disposed to lie in a plane, said plane being perpendicular to said longitudinal axis;

said membrane spring has an outer circumference;

said at least one angled portion of said membrane spring comprises at least one of a) and b) as follows:

a) a plurality of portions projecting from said outer circumference of said membrane spring;

said plurality of projecting portions comprising a plurality of tabs;

said plurality of tabs are disposed spaced apart from one another about said outer circumference of said membrane spring;

said plurality of tabs extend radially outward with respect to said outer circumference of said membrane spring;

each of said plurality of tabs has a first surface and a second surface;

said first surface and said second surface of each of said plurality of tabs are disposed to lie in a plane;

said plane of said first surface and said second surface of each of said plurality of tabs is twisted at a substantial angle with respect to said plane of said first surface and said second surface of said membrane spring; and b) a plurality of bent portions;

said plurality of bent portions are disposed within said first surface and said second surface of said membrane spring;

said plurality of bent portions comprise a plurality of undulations;

said plurality of undulations are formed concentrically within said outer circumference of said membrane spring;

each of said plurality of undulations has a first surface and a second surface;

said first surface and said second surface of each of said plurality of undulations are disposed to lie in a plane; and said plane of said first surface and said second surface of each of said plurality of undulations is disposed at a substantial angle with respect to said plane of said first surface and said second surface of said membrane spring.

18. The friction clutch according to claim 17, wherein:

said biasing means for rotating said ring comprises a tension spring;

said friction clutch further comprises:

means for sensing wear of said friction lining means; and said means for sensing wear of said friction lining means comprising means for permitting rotation of said ring with respect to said membrane spring, to increase said combined initial width dimension to adjust for said wear of said friction lining means.

19. The friction clutch according to claim 18, wherein:

said pressure plate means comprises a pressure plate;

said pressure plate is substantially torsionally stationary with respect to said clutch housing;

said pressure plate has an outer circumference;

a portion of said outer circumference of said pressure plate comprises an aperture;

said aperture extends parallel to said longitudinal axis;

said aperture has a first end portion and a second end portion;

said first end portion is disposed adjacent a portion of said flywheel;

said second end portion of said aperture is disposed a substantial distance from said first end portion of said aperture;

said aperture further comprises a bolt;

said bolt has a first end and a second end;

said first end of said bolt comprises a bolt head;

said bolt head being adjacent, and in contact with, a portion of said flywheel;

said means for sensing wear of said friction lining means is disposed adjacent, and in contact with, said second end portion of said aperture;

said second end of said bolt is disposed adjacent said means for sensing wear;

said means for sensing wear further comprises an arm;

said arm of said sensing means extends in a substantially radial direction toward said ring;

said arm has a first end and a second end;

said second end of said arm is disposed a substantial distance from said first end of said arm;

said first end of said arm is operatively connected with said means for sensing wear;

said second end of said arm is disposed adjacent, and in contact with, a portion of said ring;

said arm comprises means for permitting rotation of said ring with respect to said membrane spring upon wear of said friction lining means;

each of said plurality of tabs of said membrane spring has a first end and a second end;

each of said first end and said second end of said plurality of tabs is disposed to project radially outward with respect to said outer circumference of said membrane spring;

each of said plurality of tabs has a third end and a fourth end;

said fourth end of each of said plurality of tabs is disposed to concentrically surround a portion of said outer circumference of said membrane spring;

said third end of each of said plurality of tabs is disposed adjacent, and in contact with, a portion of said outer circumference of said membrane spring;

each of said plurality of undulations of said membrane spring has a first end portion and a second end portion;

said first end portion extends at a substantial angle with respect to said plane of at least one of: said first surface and said second surface of said membrane spring; and said second end portion extends at a substantial angle with respect to said plane of at least the other of: said first surface and said second surface of said membrane spring.

* * * * *